United States Patent [19]

Ho

[11] 4,419,460

[45] Dec. 6, 1983

[54] PHENOLIC FOAMS

[75] Inventor: Stanley S. Ho, Wilbraham, Mass.

[73] Assignee: Monsanto Company, St. Louis, Mo.

[21] Appl. No.: 280,197

[22] Filed: Jul. 6, 1981

Related U.S. Application Data

[63] Continuation-in-part of Ser. No. 219,165, Dec. 22, 1980, abandoned.

[51] Int. Cl.³ ................................................ C08J 9/14
[52] U.S. Cl. .................................... 521/123; 521/131; 521/181; 521/907; 524/437
[58] Field of Search .......................... 521/181, 123, 907

[56] References Cited

U.S. PATENT DOCUMENTS

| | | | |
|---|---|---|---|
| 3,615,396 | 10/1971 | Gramza | 430/83 |
| 3,615,414 | 10/1971 | Light | 430/75 |
| 3,615,415 | 10/1971 | Gramza | 430/134 |
| 3,615,418 | 10/1971 | Staudenmeyer et al. | 430/75 |
| 3,679,408 | 7/1972 | Kryman et al. | 96/1.6 |
| 3,692,706 | 9/1972 | Igglesden | 521/181 |
| 3,740,358 | 6/1973 | Christie et al. | 521/123 |
| 3,973,962 | 8/1976 | Contois et al. | 430/75 |
| 4,237,236 | 12/1980 | Newitzki | 521/123 |

*Primary Examiner*—Morton Foelak
*Attorney, Agent, or Firm*—A. Milton Cornwell; David Bennett; E. P. Grattan

[57] ABSTRACT

The closed cell content of a phenolic is significantly increased by the incorporation therein of a finely divided hydrated alumina.

4 Claims, No Drawings

PHENOLIC FOAMS

BACKGROUND OF THE INVENTION

This is a continuation-in-part of application Ser. No. 219,165 filed Dec. 22, 1980, now abandoned.

The invention relates to foams of phenolic resins and specifically to phenolic resins having an improved closed cell content.

Foams made from phenolic resins, that is resins of the kind typified by the polymerization product of phenol and formaldehyde, usually have a high percentage of open cells when made by conventional processes. As a result the insulating quality of such foams is not outstanding. This is unfortunate because from many other points of view phenolic resin foams are ideal for insulation purposes. They have good stability and rigidity and have inherently poor flammability.

A phenolic resin with an improved closed-cell content would therefore be a much more desirable commodity than currently available phenolic foam products that need to be laminated to achieve a respectable degree of thermal insulation performance.

DESCRIPTION OF THE PRIOR ART

The drive to obtain closed cell phenolic foams has focussed on several process features as being the key to getting closed cell structures. For example, U.S. Pat. No. 2,845,396 teaches that the water content of a resole has to be low to get good closed cell structures and U.S. Pat. No. 3,389,094 combines this feature with the use of fluorocarbon blowing agents.

Others such as U.S. Pat. Nos. 3,953,645, 4,140,842 and 4,133,931 teach the importance of specific surfactants in getting closed cell foams.

The present invention defines a quite different route to increasing the closed cell content of a phenolic resin foam. Moreover, the invention is applicable to foaming processes which involve unconstrained expansion of the foaming resin as well as more restricted expansion techniques.

The invention offers a relatively inexpensive way of upgrading the insulating quality of a phenolic foam to a level at which it may be competitive with foams produced by more complex formulations and processes.

DESCRIPTION OF THE INVENTION

The invention provides a foam composition having a density of from 0.032 to 0.064 gm/cc and a closed cell content of at least 50% comprising a resole with a formaldehyde to phenol mole ratio of from 1.2 to 2.5:1 and from 2 to 15% by weight based on the resole weight of a finely divided hydrated alumina.

The use of hydrated alumina as a filler, a fire retardant anti-punking additive and a smoke supressant for thermoplastics is widely known. U.S. patents with this teaching include U.S. Pat. Nos. 4,237,236 and 3,740,358.

It has, however, been found that significant quantities, usually at least 20% by weight, of alumina is required to have a significant effect on these properties. It has now been found that in much smaller quantities, hydrated alumina reduces the percentage of open cells in a resole foam structure very dramatically.

The amount of hydrated alumina used can be from 2 to 15% based on the resole weight but generally satisfactory results have been obtained with from 5 to 10% by weight. This is very significantly less than the amounts in which the additive is used as a filler or anti-punking additive where 20 to 50% or more by weight is conventional.

The hydrated alumina is finely divided: that is, it is in the form of a 250 to 400 mesh powder. Generally, average particle sizes of 1 to 2 microns are preferred for adequate dispersion in the composition.

The density of the foam produced can be anywhere in the range of 0.032 to 0.064 gm/cc but densities of about 150 to 200 gm/cc are generally preferred.

The foam has a closed cell content of at least 50% and more frequently substantially in excess of that figure, for example, from 70 to 95% or even higher.

The blowing agent used to obtain the foam can be any of those capable of blowing a resole. Generally, and most preferably these are physical blowing agents such as a fluorocarbon, methylene chloride or carbon dioxide. The preferred blowing agents on account of their low thermal conductivity are fluorocarbons such as Freon 11, Freon 113 and Freon 114.

The composition may comprise other conventional components such as surfactants, curing accelerators, filler materials such as glass fibers, and the like and the finished foams may be laminated to other materials to provide any desired surface finish.

The composition may be foamed in any desired manner such as extrusion onto a moving surface to form a continuous sheet, or by foaming in a mold. Excellent results have been obtained in terms of increase in closed cell content by allowing the foam to expand by the "free rise" method, i.e., without a constraint to expansion in at least one major direction. A preferred process therefore comprises despositing the foamable composition in a mold and permitting freerise to take place for at least a major portion of expansion process.

DESCRIPTION OF THE PREFERRED EMBODIMENTS

The invention is now more particularly described with reference to the following Examples which are for the purpose of illustration only and are intended to imply no limitation on the essential scope of the invention.

EXAMPLE 1

Six foamable compositions were made; four being illustrative of the invention and two being for the purposes of comparison.

The compositions and results are set out in Table 1 below. The components used were as follows:

Resin A—a phenol/formaldehyde resole with an F/P ratio of about 2:1 formed by polymerization using a calcium oxide catalyst followed by neutralization using oxalic acid.

Resin A-I—a mixture of Resin A with Hydral PGA, a hydrated alumina available under that designation from Alcoa Corp. in a ratio of 10 parts resin to 1 part Hydral.

Resin B—a phenol/formaldehyde resole with an F/P ratio of about 1.5:1. The resin is otherwise identical to Resin A.

Resin B-I—Resin B mixed with Hydral PGA in a ratio of 10:1.

Surfactant—a silicon based surfactant available from Dow Corning Corp. under the designation DC-193.

Blowing Agent I—a chlorofluorocarbon blowing agent available from DuPont Co., under the designation Freon 113.

Blowing Agent II—a chlorofluorocarbon blowing agent available from DuPont Co., under the designation Freon 114.

Cure Catalyst I—a 1/1 (by weight) mixture of ethylene glycol and an acid which is itself a 1/1 (by weight) mixture of toluene and xylene sulfonic acids.

Cure Catalyst II—a 2/1 (by weight) mixture of diethylene glycol with the acid mixture of catalyst I.

The apparatus used was a cylindrical pressure cell 200 cm in diameter and in each case unconstrained rise inside the cell was allowed. The block was cured in two stages: in the mold and then in an oven at 55° C. The time in both stages is given.

In each case the percentage of closed cells was measured using an air pyncnometer. The density of each foam was recorded and also the thermal conductivity (K) after the indicated number of days.

that one foam sample contained 10% by weight of hydrated alumina, (Hydral PGA).

Test pieces one half inch thick were cut from each sample and each piece was clamped horizontally. One side of the foam (the upper side) was just contacted with a thermocouple and a bunsen flame was played on the lower side till the thermocouple registered 260° C. The flame was then removed and the time taken for the temperature to drop to 65.5° C. was observed. With punking this time is significantly protracted over that observed when punking is absent.

Both samples showed behavior characteristic of phenolic foam. A layer of char formed in the portion contacted by the flame. After removal of the flame both samples exhibited punking behavior for 112 seconds (with Hydral) and 107.5 seconds (without Hydral). No significant difference could therefore be observed in the behavior of the samples. It is therefore concluded that at or below the lvel of about 10% and probably up to 15% the presence of hydrated alumina has no significant affect on the fire retardant characteristics of the

TABLE I

| | Comp. 1 | Invention 1 | Invention 2 | Comp. 2 | Invention 3 | Invention 4 | Comp. 3[1] | Invention 5[1] |
|---|---|---|---|---|---|---|---|---|
| Composition | | | | | | | | |
| Resin A | 200 gm. | | | | | | | |
| Resin A-1 | | 220 gm. | 220 gm. | | | | | |
| Resin B | | | | 150 gm. | 75 gm. | | 200 gm. | |
| Resin B-1 | | | | | 75 gm. | 150 gm. | | 220 gm. |
| Surfactant | 8 gm. | 8 gm. | 8 gm. | 6 gm. | 6 gm. | 6 gm. | 8 gm. | 8 gm. |
| Blowing Agent I | 36 gm. | 36 gm. | 36 gm. | 27 gm. | 27 gm. | 27 gm. | | |
| Blowing Agent II | | | | | | | 29.0 | 27.6[2] |
| Cure Catalyst I | 10.8 gm. | 12 gm. | 7.2 gm. | | 2.4 gm. | | | |
| Cure Catalyst II | | | | 6.75 gm. | | 6.75 gm. | 13.8 | 8.96 |
| Reaction | | | | | | | | |
| Cure | 30 min. + 18 hr. | 30 min. + 18 hr. | 30 min. + 18 hr. | 30 min. + 18 hr. | 30 min. + 18 hr. | 30 min. + 18 hr. | 30 mins. at 70° C. + 18 hrs. at 60° C. | 30 mins. at 70° C. + 18 hrs. at 60° C. |
| Properties | | | | | | | | |
| Density gm/cc | .038 | .041 | .048 | .032 | .046 | .039 | .047 | .066 |
| % closed cell | 86.1 | 93.5 | 91.7 | 2.2 | 91.9 | 50.0 | 78.7 | 94.4 |
| Thermal Conductivity (K) (watts/M. °C.) (after the no. of days indicated) | .017 (4) .030 (14) | .015 (4) .016 (14) .018 (22) .017 (28) .018 (63) .019 (101) .020 (162) .021 (185) | .020 (4) .020 (14) .019 (22) .020 (28) .020 (63) .021 (101) .022 (162) .022 (185) | | .019 (15) .020 (26) .019 (60) .020 (98) .019 (159) .019 (182) .019 (242) .020 (347) .020 (428) | | .028 (15) | .017 (16) .018 (18) .017 (25) .018 (45) .018 (66) .018 (132) .018 (210) |

[1]The Comparative (3) and Invention (5) runs were performed in a continuous manner with the mixture being deposited on a moving surface instead of in a mold. The resin was free to expand in all directions and the initial cure (70° C.) took place as the foam moved through a heated tunnel.
[2]This figure is dubious in view of the high density of the foam produced.

The above data clearly shows that the incorporation of hydrated alumina keeps the thermal conductivity low and stable by comparison with the foam without alumina.

It is clear that the closed cell content rises when the alumina is introduced.

EXAMPLE 2

This Example is intended to demonstrate that the level of addition of alumina required to ensure closed cell content improvement is much below that at which the foam would have significantly different flammability characteristics. Two samples of phenolic foam were prepared identical in formulation and density except resin.

What is claimed is:

1. A foam composition having a density of 0.032 to 0.064 grams/cubic centimeter and a closed cell content of at least 50% comprising a resole with a formaldehyde to phenol mole ratio of from 1.2 to 2.5:1 and from 2 to 15% by weight, based on the resole weight, of finely divided hydrated alumina.

2. A foam composition according to claim 1 which has been blown using a fluorocarbon blowing agent.

3. A foam composition according to claim 1 in which the weight proportion of hydrated alumina is from 5 to 10% of the resole weight.

4. A foam composition according to claim 1 with a closed cell content of from 70 to 95%.

* * * * *